United States Patent [19]
Fitsakis

[11] Patent Number: 5,359,808
[45] Date of Patent: Nov. 1, 1994

[54] TRAP BAG FOR THE EXTERMINATION OF INSECTS WITH AN INSECTICIDE SOAKED SURFACE AND A LIQUID SOLUTION CONTENT WITH INSECT ATTRACTING SUBSTANCES

[76] Inventor: Thomas Fitsakis, 31, Antiochetas Str, Heraklion, Greece, 713 05

[21] Appl. No.: 19,653

[22] Filed: Feb. 19, 1993

[30] Foreign Application Priority Data

Feb. 19, 1992 [GR] Greece ............... 920100069

[51] Int. Cl.⁵ ............................................. A01M 1/20
[52] U.S. Cl. ................................. 43/132.1; 43/131
[58] Field of Search ............... 43/107, 131, 132.1

[56] References Cited

U.S. PATENT DOCUMENTS

| | | | |
|---|---|---|---|
| 3,118,427 | 1/1964 | Stanzel | 43/131 |
| 3,605,321 | 9/1971 | Lazarus | 43/131 |
| 3,931,692 | 1/1976 | Hermanson | 43/131 |
| 4,160,335 | 1/1979 | Von Kohorn | 43/131 |
| 4,218,843 | 8/1980 | Clarke | 43/131 |
| 4,310,985 | 1/1982 | Foster | 43/131 |
| 4,638,057 | 1/1987 | Takahashi | 43/131 |
| 4,899,485 | 2/1990 | Schneidmiller | 43/107 |
| 5,150,541 | 9/1992 | Foster | 43/131 |
| 5,152,096 | 10/1992 | Rudolph | 43/131 |

Primary Examiner—Kurt C. Rowan

[57] ABSTRACT

A trap for the extermination of insects and particularly of may-flies (olive fly, domestic fly, cherry fly and Mediterannean fly) comprising a trap bag with an insecticide soaked surface, containing a water or water solution with insect attracting substances, insects being killed as they fall upon the toxic surface of this trap bag. The materials used in manufacturing this trap are such as to allow a slow, continuous and controlled evaporation of the substances contained therein, the service life of the trap bag being extended by periodically adding a water solution of the insect attracting substances.

6 Claims, 2 Drawing Sheets

TRAP BAG FOR THE EXTERMINATION OF INSECTS WITH AN INSECTICIDE SOAKED SURFACE AND A LIQUID SOLUTION CONTENT WITH INSECT ATTRACTING SUBSTANCES

THE FIELD OF THE ART

The present invention relates to the field of the art of insecticide means, and particularly of traps for the extermination of adult dipteres (may-flies), working under ambient conditions.

THE BACKGROUND OF THE INVENTION

Various traps for the extermination of insects are known in the prior art, however these traps have not succeeded in providing an efficient extermination of insects, due to various reasons associated with either the materials used and/or their structural characteristics.

By way of example, the U.S. Pat. No. 4,218,843 of Clarke Jr., 4,130,092 of Eshnaur et al and 4,706,410 of M. W. Briese, as well as the UK patent No. 1 360 802 of ICI ltd, all refer to traps for the aquatic mosquito and to the extermination of larvae of this kind. On the contrary, the object of the present invention is the extermination of adult dipteres (may-flies). On the other hand, operation of these insect traps of the prior art is based on the dissolution of solid toxic substances within the liquid phase surrounding the trap, whilst operation of the trap bag proposed in the present invention is controlled and based upon the controlled emission of vapour containing insect attracting substances, the insects being killed by the mere contact with the insecticide soaked surface of the trap bag. Thus, due to their mode of operation and to the materials used in their construction, the trap bags of the present invention offer an increased service life, whilst respecting the environment.

The traps of the prior art constitute a serious threat to the environment, create dangers for their users and act indifferently against useful insects as well. Their polluting action is due both to the materials used in their construction (e.g. plastics), or to the water, soil and air pollution caused by their operation due to the emission of toxic substances therefrom. It is further noted that it is not possible for these traps of the prior art to acquire a renewed effectiveness by means of their periodical filling with the required substances and thus they must be disposed off after a single usage. Similar disadvantages may be referred in connection to the liquid spraying of toxic substances, the effectiveness of which deteriorates rapidly after their drying, whilst they additionally leave toxic remnants upon the products onto which they are used.

It is an object of the present invention to effectively overcome the abovementioned drawbacks of the prior art, by providing a low cost environmental and highly effective trap for the extermination of a specific category of insects.

In accordance to the present invention a trap bag for the extermination of insects is proposed, particularly of the olive fly, of the Mediterrannean fly, of the cherry and of the domestic fly, this trap bag comprising a porous surface soaked with a suitable toxic insecticide, a controlled, continous emission of a desired mixture of substances attracting this particular category of insects being provided through the abovementioned porous surface, these insects being exterminated when falling upon the insecticide soaked surface of the trap bag. The service life of the proposed trap bag is longer than that obtained by insecticide means of the prior art and it can be prolongued by periodically renewing the insect attracting substances contained therein.

BRIEF DESCRIPTION OF THE DRAWINGS

The present invention will be made apparent to those skilled in the art by reference to the accompanying drawings, depicting illustrative embodiments of the invention.

DETAILED DESCRIPTION OF PREFERRED EMBODIMENTS

The object of the invention being the suggestion of an efficient trap for the extermination of insects, particularly of those insects intensely present during the dry-hot summer period, from July to October, it is realised without any adverse effect on the tree and its fruits that could be caused by liquid spraying with poisonous substances, but merely by means of hanging on the trees a suitable number of traps, this number depending on the overall area of the farm. Each trap bag basically comprises an insecticide soaked surface whereupon fall and are killed the harmful insects, which are attracted to fall thereupon by a controlled emission, through this same surface, of a water solution containing substances which attract these insects.

The proposed trap bag for the extermination of insects may be made in various shapes and sizes, the illustrative depicted trap being of rectangular shape with dimensions of the order of 13.5X 20 cm, which is considered satisfactory for one large tree, whereas a plurality of 12-14 trap bags of this size are considered to offer an adequate protection for an area of 1000 m2 of densely planted land.

It is well known that during the dry hot summer period, insects search for a humid environment, such environment being offered by the trap of the invention, which provides a constant, slow and controlled evaporation of a water solution, which, in accordance to a preferred embodiment of the invention, contains and emitts in the same time, odours of nourishing or pheromonic substances or of any combination of the same.

Figure 1:
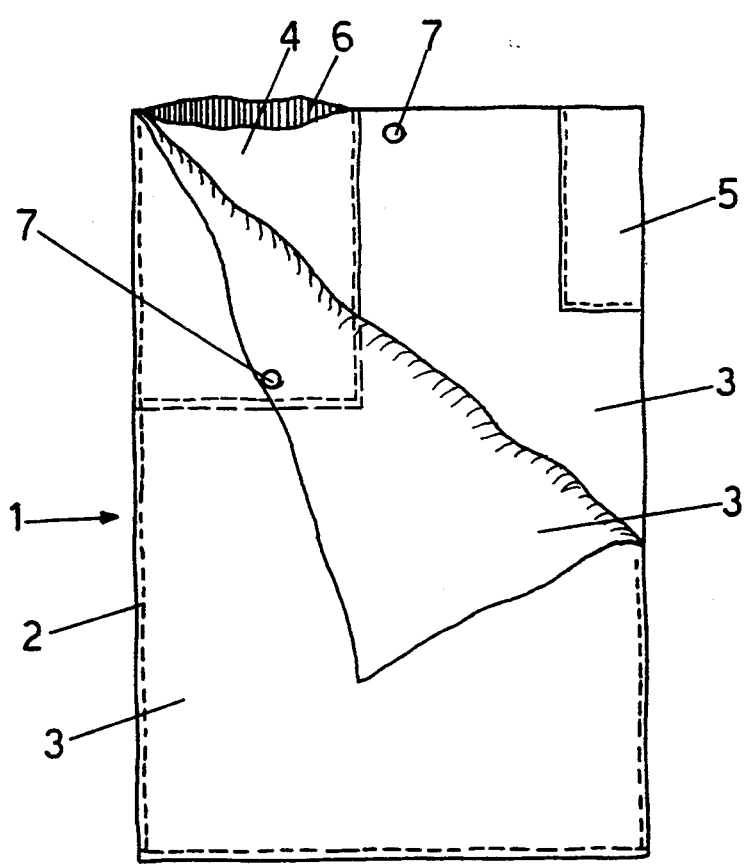
FIG. 1 shows a first illusrtative embodiment of the trap bag for the extermination of insects of the invention, comprising a fabric made bag of rectangular section with three compartments.

In accordance to a first preferred embodiment of the invention, the trap for the extermination of insects depicted in FIG. 1 comprises a bag 1, the side of which are glued or stitched together by means of stapler 2. The upper sides of the bag are also glued or stitched together, however leaving an aperture 6 via which the trap is filled with water or water solution contained within the largest compartment 3 of the bag. Whilst the trap bag may consist of a single compartment 3 within which may be contained a water solution of any desired insect attracting substances, it is preferred to form two independent smaller compartments 4 and 5 which communicate with the main compartment 3 and within which are stored nourishing attracting substances and pheromonic attracting substances and/or insecticide respectively. The trap bag is, during its manufacturing, immersed within an insecticide substance, and obtains, when exposed to the atmosphere and following its slight external humidification, a permanent surface toxicity. It is preferred to sell the proposed trap bag within a suitable packaging, so as to avoid any contact with its toxic surface, users simply having to hang the trap bag onto the tree by means of an upper aperture attachement 7 and then remove the packaging in order to set the trap in a full and continous operation.

Various materials can be used in manufacturing the trap bag for the extermination of insects of the invention, and in accordance to a preferred embodiment of the invention fabric is used with such a thread and weaving which is adequate in conserving the water solution for a long time on the one hand and in allowing evaporation of a controlled quantity of vapours through the same, on the other hand. This necessary condition for an effective operation of the trap bag of the invention can also be fulfilled when other materials are used, such as, for example, paper with or without an internal and/or external cover from aluminum foil, polyethylene, PVC, wax, other plastic or other insulating material. The trap bag may similarly be made from synthetic materials, which are suitably processed so as to present the necessary condition of a continuous, controlled evaporation of the water solution contained therein. The trap bag may also be made using any desired combination of the abovementioned or other materials. By way of example different materials can be used in each of the two surfaces of the trap bag, whereas materials can also vary either along the horizontal or along the vertical direction of each of these surfaces. Multilayer trap bags can also be made using a plurality of layers made from the abovementioned or other materials.

All the abovementioned constructions fulfill the requirement for the conservation of the water solution within the bag and for the progressive, continous and controlled evaporation of this water solution through the porous structure of the material, whilst in the same time maintaining a low cost and using non-polluting materials which may be easily recycled.

Figure 2:
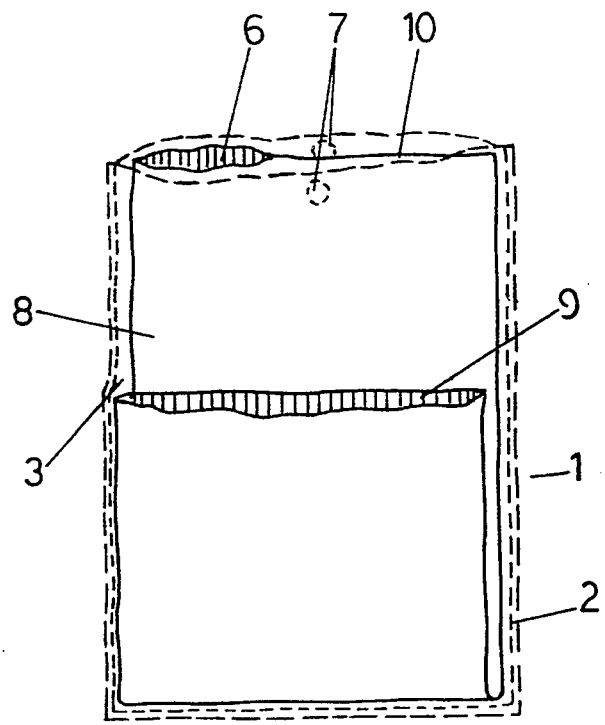
FIG. 2 shows an alternative second illustrative embodiment of the trap bag for the extermination of insects of the invention, comprising a fabric made bag of rectangular section with an internal flexible, foldable plastic tubular bag filled with water.

A practical solution, particularly suitable for fabric made trap bags, which may show undesired leakage of the water solution along the lines of stitching, is the alternative embodiment of the invention shown in FIG. 2, in accordance to which a plastic tubular bag 8 is folded within trap bag 1, in a way such that its upper surface 10 is closed by being stitched together with the upper ends of trap bag 1, always leaving an aperture for filling the trap bag with water or water solution, whilst the bottom end of the tubular bag is situated at a height, approximately of the order of two thirds of the overall height of the trap bag, and is left open so as to allow for the controlled evaporation of the water or water solution contained within this plastic tubular bag 8.

Figure 3:
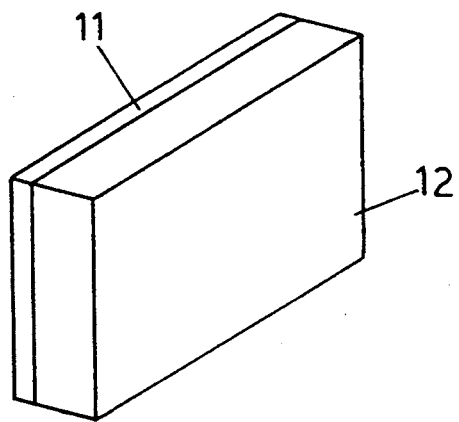
FIG. 3 shows a third alternative illustrative embodiment of the trap bag for the extermination of insects of the invention, comprising a solid insecticide plate in contact with a plastic container of a water solution with insect attracting substances.

Finally, in accordance to a further alternative embodiment of the invention depicted in FIG. 3, the trap may also be of the type of a solid insecticide plate 11, preferably covered by a fabric made insecticide bag and in contact with a container, e.g. a plastic container 12, wherefrom is continuously emitted a controlled quantity of vapours of the water or water solution contained therein.

The above described trap bag for the extermination of insects, particularly of the olive fly, the domestic fly, the cherry fly and of the mediterrannean fly is preferably made in neutral colours so that it will not attract other insects, which may be useful ones, besides those which are to be exterminated, whereas when offered in suitable colours, it may also serve the purpose of a colour trap.

The employment of various materials can lead to a varying service life of the trap bag, its service life being extended when hygroscopic substances are added into the water solution. It is noted that the same trap can operate effectively for a long time, as long as the attracting substances solution is periodically renewed.

Herein below, fabric made trap bags made in accordance to the present invention are compared with conventional massive insect capture wooden traps and with liquid spraying against the olive fly.

Four different attractives with code numbers 1, 2, 3, 4 were used. Attractives 1, 2 and 3 were used in all cases, whilst attractive 4 could only be tested with the fabric made trap of the invention. However it was used at a high concentration and therefore acted in an adverse repulsive manner.

The experimental farm was designed with four repetitions of random groups of the above attractives.

The results were analysed in accordance to DUNCAN at a level $P=0.05$. The results are given below and it is noted that identical letters do not present significant statistical differences, the results being given for the average of four repetitions.

Y1 (Fabric trap with nourishing attractive 1): 134.00 A

Y2 (Fabric trap with nourishing attractive 2): 96.75 AB

F1 (Bundle of branches sprayed with nourishing attractive 1): 88.75 ABC

F2 (Bundle of branches sprayed with nourishing attractive 2): 86.75 ABC

F3 (Bundle of branches sprayed with nourishing attractive 3): 79.75 ABC

Y3 (Fabric trap with nourishing attractive 3): 28.00 BC

X1 (Wooden trap with nourishing attractive 1): 14.75 BC

X2 (Wooden trap with nourishing attractive 2): 11.75 BC

X3 (Wooden trap with nourishing attractive 3): 5.75 C

Y4 (Fabric trap with nourishing attractive 4): 3.00 C

It must be noted that the invention was described by reference to illustrative, but not confining examples. Thus, any change or amendment relating to the shape, size, mode of operation, dimensions, materials and accessories used, as long as it does not comprise a new inventive step, is to be considered within the aims and scope of the present invention.

I claim:

1. Trap for the extermination of insects, particularly of may-flies (olive, domestic, cherry and Mediterranean flies), comprising a trap bag, said trap bag being internally divided in at least two compartments, a relatively larger first compartment containing water and a relatively smaller second compartment containing insecticide and insect attracting substances, said trap bag being made from a porous material adequate in containing water and allowing a constant, slow and controlled evaporation of water vapours and insect attracting substances contained therein, said trap bag having an insecticide soaked surface, said insects being exterminated when falling upon said insecticide soaked surface, said trap bag comprising an upper aperture for hanging upon a branch of a tree.

2. The trap for the extermination of insects of the above claim 1, said trap bag being internally divided in three compartments, a relatively larger first compartment containing water and relatively smaller second and third compartments containing nourishing insect attracting substances and pheromonic insect attracting substances respectively.

3. Trap for the extermination of insects, particularly of may-flies (olive, domestic, cherry and Mediterranean flies), comprising a trap bag, said trap bag being made from a porous material adequate in containing water and allowing a constant, slow and controlled evaporation of water vapours and insect attracting substances contained therein, said trap further comprising a plastic tubular bag, said tubular bag being foldable within said trap bag, upper end of said plastic tubular bag being stitched together with upper sides of said trap bag, a small aperture being left along stitched said upper end of said plastic tubular bag and upper sides of said trap bag to allow for filling said tubular bag with water, lower end of said plastic tubular bag being raised at a height equal to two thirds of the overall height of said trap bag, said lower end of said plastic tubular bag being left open to allow a continuous, slow and controlled evaporation of water through said trap bag, said trap bag having an insecticide soaked surface, said insects being exterminated when falling upon said insecticide soaked surface.

4. The trap for the extermination of insects according to any one of claims 1–3, wherein said porous material adequate in containing water and allowing a constant, slow and controlled evaporation of water vapours and insect attracting substances contained therein is fabric.

5. The trap for the extermination of insects according to any one of claims 1–3, wherein a packaging means is employed to cover said insecticide soaked trap bag, said packaging means being removed to set said trap in a full and continous operation.

6. Trap for the extermination of insects, particularly of may-flies (olive, domestic, cherry and Mediterranean flies), comprising an insecticide solid plate, said insecticide solid plate being covered by an insecticide soaked fabric made bag and in contact with a container of water, said container providing a continous, slow and controlled evaporation of said water, said insects being exterminated when falling upon said insecticide soaked fabric.

* * * * *